Figure 1:
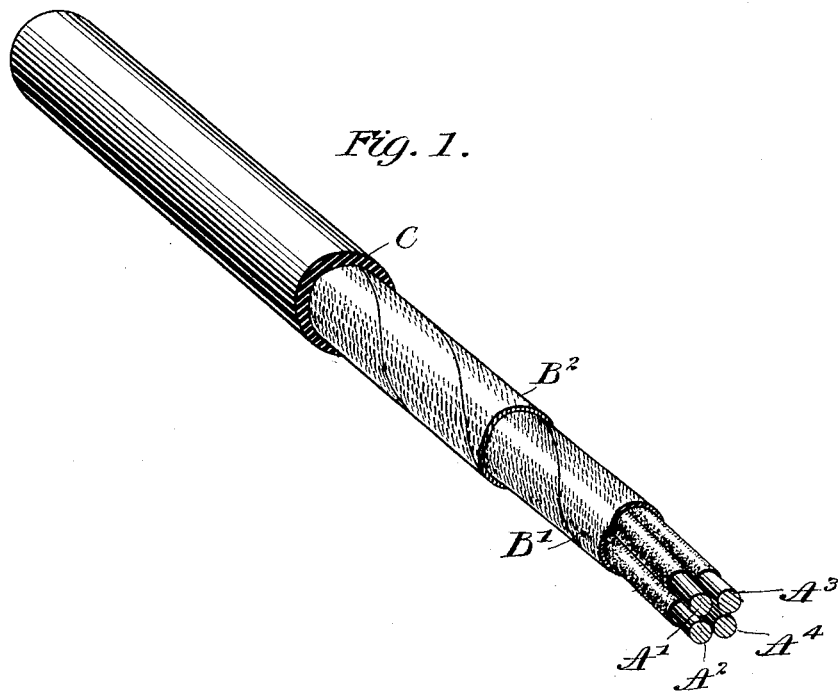

(No Model.)

J. H. KELMAN.
ELECTRIC CABLE.

No. 594,882.  Patented Dec. 7, 1897.

WITNESSES:
Frank S. Ober
James Oswald

INVENTOR:
John H. Kelman.
BY H. B. Brownell,
ATTORNEY

UNITED STATES PATENT OFFICE.

JOHN HALL KELMAN, OF PITTSFIELD, MASSACHUSETTS.

ELECTRIC CABLE.

SPECIFICATION forming part of Letters Patent No. 594,882, dated December 7, 1897.

Application filed September 25, 1897. Serial No. 652,987. (No model.)

*To all whom it may concern:*

Be it known that I, JOHN HALL KELMAN, a citizen of the United States, residing at Pittsfield, Berkshire county, Massachusetts, have invented certain new and useful Improvements in Electric Cables, of which the following is a full, clear, and exact description.

My invention relates to cables for the transmission of electric currents consisting of several—that is, two or more—conductors insulated from each other and contained in and held together by a protecting sheath or armor. Such cables are now in general use in telephone and telegraph circuits and are placed in some cases overhead and in others beneath the surface of the ground or under water. The particular armor to be used depends upon the conditions to which the cable is subject. For instance, an overhead cable may have an armor consisting of a braided sheath of cotton strands, or may have a sheath of woven steel wires, or may have a protecting-sheath of lead. Underground cables very generally have a lead sheath or some other covering resisting the action of the earth and moisture.

Two of the principal difficulties to contend with in the cables as now made are the static charge between the pair of wires, or between the wires and the earth, and the dynamic induction on each wire, both of which difficulties are due to the interrupted or varying currents flowing through the wires and acting through the dielectrics used to separate the wires from one another. The static charge is a serious matter and depends upon the specific inductive capacity of the dielectric used to separate the wires of the cable and also upon the distance between the wires, being greater the closer the wires are brought together. The dynamic induction is also serious and increases as the wires are separated. In a cable, therefore, in which the separating-dielectric is of high specific inductive capacity a mean relative position for the wires must be selected which will give the minimum interference to the proper flow of the currents due to both the static charge and the dynamic induction. I am aware that attempts have been made to reduce these deleterious influences by offsetting self-induction effect against that of capacity; but it must be obvious that any attempt of this kind can be successful for only one particular frequency, and it may, in fact, give rise to inferior results to those yielded by the natural circuit should the frequency be very much altered. I, on the other hand, reduce both elements as far as possible with a result that, however far they may be out of balance, no serious injury can follow.

The principal object of my invention is to produce a cable in which the wires are brought into close proximity without resulting in a serious static charge. The close proximity results in two advantages—to wit, less mutual induction between the circuits and a cable of smaller bulk.

My invention has also for its object to produce a cable of durability and flexibility having high insulating properties and high resistance to disruptive discharges, all of which are attained by the improvement hereinafter set forth, reference being had to the accompanying drawings, in which—

Figure 2:
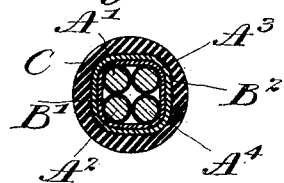

Figure 1 represents a perspective view of a cable embodying my invention, and Fig. 2 represents a cross-section of the same.

In the drawings, $A'$ $A^2$ $A^3$ $A^4$ are four copper conductors. Two tapes $B'$ $B^2$ are wound in opposite directions, so as to firmly hold and thoroughly cover the bunch of conductors. An exterior armor C covers the tapes. Upon each conductor is a separately-applied continuous coating of linseed-oil varnish. This coating is baked upon the wire in extended lengths and adheres firmly to the surface thereof. I use a coating consisting of pure linseed-oil. The linseed-oil varnish may, however, consist of any varnish or coating material in which the principal element is linseed-oil—such, for instance, as baking japan, containing linseed-oil or equivalent mixtures—containing a similar drying-oil. The thickness of the coating depends upon the purpose for which the cable is used. In most cases two or three coats of varnish, each coat separately baked and hardened by oxidizing, so as to be firm, will be found sufficient. Each of the conductors being thus coated there are between the metal portions of two conductors two layers of linseed-oil varnish separated by a film of air. Each of these layers is, however, very thin, so that the metal portions of the conductors come very close together, reducing to a minimum the dynamic induction heretofore referred to. The specific inductive capacity of the coating of linseed-oil varnish is, however, so low that the nearness of the conductors does not result in a serious static charge. In other words, the conductors can be brought into very close proximity without resulting in a static charge, which interferes with the use of the cable and with the result that the dynamic induction is very little and that the cable is of small bulk.

The cable thus constructed possesses the advantages of cables employing conductors covered with gutta-percha or rubber mixture or paper, but not their disadvantages. It has flexibility and durability as well as extraordinarily high insulating properties and resistance to disruptive discharges. In all these particulars it is equal if not superior to cables employing gutta-percha, rubber mixtures, or paper. It is superior to cables employing gutta-percha covered or rubber-covered conductors, since these coverings are of high specific inductive capacity, making it necessary, in order to reduce the static charge, to separate the conductors more than would be necessary to simply resist the stress of the current and to select a mean compromise distance at which the static charge and dynamic induction will cause the minimum disturbance, while the linseed-oil varnish coating is of so low specific inductive capacity that the conductors may be brought into as close proximity as the insulation necessary to resist the stress of the current will permit. It is superior to paper in that it does not deteriorate or absorb moisture and so weaken or permit leakage of current, but forms a continuous coating impervious and lasting and of little bulk. In a word it possesses to a marked degree the advantages of the best cables now in use without having their faults or being open to the objections made to them.

What I claim is—

1. A cable consisting of several conductors, each separately coated with a continuous coating of varnish hardened by oxidation, and a covering holding said conductors together in close proximity, substantially as described.

2. A cable consisting of several conductors, each separately coated with a continuous coating of linseed-oil varnish, and a covering holding said conductors together in close proximity, substantially as described.

Signed at Pittsfield, in the county of Berkshire and State of Massachusetts, this 23d day of September, 1897.

JOHN HALL KELMAN.

Witnesses:
FRANK R. WHITTLESEY,
ROBERT M. RODGERS.